(12) United States Patent  (10) Patent No.: US 8,838,843 B2
Koara  (45) Date of Patent: Sep. 16, 2014

(54) ELECTRONIC APPARATUS (75) Inventor: Kengo Koara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/232,945

(22) PCT Filed: Aug. 4, 2011

(86) PCT No.: PCT/JP2011/067896
§ 371 (c)(1),
(2), (4) Date: Jan. 15, 2014

(87) PCT Pub. No.: WO2013/018227
PCT Pub. Date: Feb. 7, 2013

(65) Prior Publication Data
US 2014/0156873 A1  Jun. 5, 2014

(51) Int. Cl.
G06F 3/00 (2006.01)
G06F 9/44 (2006.01)
(52) U.S. Cl.
CPC .................................. G06F 9/4411 (2013.01)
USPC ...................................... 710/13; 361/679.37
(58) Field of Classification Search
None
See application file for complete search history.

(56) References Cited

U.S. PATENT DOCUMENTS 5,581,786 A * 12/1996 Saito et al. ........................ 710/8
2007/0043888 A1  2/2007 Suzuki et al.
2010/0268863 A1 * 10/2010 Yamazaki et al. ............. 711/102
2011/0289596 A1 * 11/2011 Sebesta et al. .................... 726/28
2012/0124288 A1 *  5/2012 Li et al. .......................... 711/115

FOREIGN PATENT DOCUMENTS

| CN | 101354568 A | 1/2009 |
| JP | 2007-52727 A | 3/2007 |
| JP | 2009-31844 A | 2/2009 |
| JP | 2010-198112 A | 9/2010 |

OTHER PUBLICATIONS

Taiwanese Office Action for TW 100133582 dated Oct. 21, 2013.
International Search Report for PCT/JP2011/067896 dated Sep. 20, 2011.

* cited by examiner

*Primary Examiner* — Elias Mamo
(74) *Attorney, Agent, or Firm* — Sughrue Mion, PLLC (57) ABSTRACT

A programmable display device includes a USB interface to which a USB removable drive device is connected, a nonvolatile memory configured to store USB removable drive device peculiar information peculiar to the USB removable drive device and drive allocation fixing setting information indicating correspondence between the USB removable drive device and a drive number and incorporated in the programmable display device, and a control unit configured to allocate, when information coinciding with the USB removable drive device peculiar information acquired from the USB removable drive device connected to the USB interface is included in drive allocation information stored in the nonvolatile memory, a drive number associated according to the drive allocation information to the USB removable drive device connected to the USB interface.

4 Claims, 6 Drawing Sheets

ELECTRONIC APPARATUS

CROSS REFERENCE TO RELATED APPLICATIONS

This application is a National Stage of International Application No. PCT/JP2011/067896 filed Aug. 4, 2011, the contents of which are incorporated herein by reference in their entirety.

FIELD

The present invention relates to an electronic apparatus such as a personal computer or a programmable display device on which a removable drive device, which is a detachable storage medium mounted on an USB (Universal Serial Bus) interface, can be mounted.

BACKGROUND

When peripheral equipment is added to a personal computer or a notebook personal computer taking into account space saving, there are an increasing number of cases where devices conforming to a USB, which is a general-purpose standard, are used. In particular, from the viewpoint of portability of data, the use of a removable drive (a detachable external storage medium) conforming to the USB has been spread. This tendency is not limited to the personal computer. In recent years, the degree of the spread is increasing in industrial equipments such as a programmable display device, which is a touch panel type display and operation apparatus.

Usually, a removable drive device connected to an electronic apparatus such as a personal computer is managed by the connection target electronic apparatus after a drive number is allocated to the removable drive device. For example, when a removable drive device is mounted on an apparatus such as a personal computer, which is a connection target of the removable drive device, in general, the drive number to be allocated to the removable drive device is set in order from the lowest one among unused drive numbers (actually, the drive numbers are often alphabets such as A, B, and C rather than numerical values). In a general-purpose operating system of a personal computer, the drive number of a previously mounted removable drive can be reallocated. The removable drive once allocated with a drive number realizes a function in which the drive number designated last time is automatically allocated even when the removable drive is removed and attached again.

Concerning allocation of a drive number, there is proposed a method of giving information for specifying a drive number to an external storage medium (hereinafter referred to as a removable device) itself such as a memory card or a USB memory mounted on a removable drive device to fix a drive number allocated to the mounted removable device (Patent Literature 1).

There is proposed a method of allocating a corresponding drive number to each of connection ports (interfaces) of a built-in device to fix a drive number of a removable drive connected to the connection port (Patent Literature 2).

CITATION LIST

Patent Literature

Patent Literature 1: Japanese Patent Application Laid-open No. 2010-198112

Patent Literature 2: Japanese Patent Application Laid-open No. 2007-52727

SUMMARY

Technical Problem

However, in an apparatus in the past such as a personal computer adapted to a removable drive, when a removable drive device other than the removable drive device allocated with a drive number in the past is mounted, an unallocated drive number is allocated in order from the lowest number. As a result, at a point when the removable drive device allocated with the drive number in the past is mounted again, if the drive number allocated to the removable drive device before has already been used, eventually, unused drive number is allocated. As a result, there is a problem in that, when there are a plurality of removable drive devices to be mounted, a drive number for specifying a drive changes according to the order of mounting of the removable drive devices on an apparatus.

The problem is less likely a problem in the case of an apparatus such as a personal computer that selects, from a GUI (Graphical User Interface), a drive that an operator sets as a target of operation such as copying of a file.

On the other hand, in an apparatus such as a production apparatus, the behavior of which is elaborated in advance to limit operation by an operator as much as possible, there is a problem explained below. As a specific example, a programmable display device including a display screen and a touch panel and configured to perform state display and operation of an apparatus is examined as an example.

The programmable display device is an apparatus including a communication interface and configured to communicate with an external control device such as a programmable logic controller (PLC) through the communication interface, monitor a value of a device memory of the external control device, and to change the value of the device memory of the external control device to enable monitoring of the state of an apparatus and operation of the apparatus. The programmable display device has collecting functions for time-series data such as an alarm function for periodically monitoring the device memory of the external control device and, when a condition set in advance is established, grasping it as an event and recording messages corresponding to the event in time series and a logging function for acquiring values from a series of device memories of the external control device periodically or when an event is established and recording the values in a file in time series (such time-series data is hereinafter referred to as "log data"). Setting of a screen displayed on the programmable display device and of various functions is carried out by drawing software, which is an application running on a personal computer.

In general, the log data is stored in an external storage medium such as a memory card for retention during power interruption because the log data is information important for grasping an operation history of an apparatus. Therefore, the programmable display device includes a drive for mounting the external storage medium. On the other hand, there are an increasing number of uses in which the log data collected in the external storage medium is extracted so as to be viewed and analyzed in a system such as a personal computer.

Under such circumstances, such an usage is assumed in which, to extract the log data according to necessity, a removable drive is mounted on the programmable display device separately from the external storage device for management of the log data in the programmable display device and the log data is copied to another external storage medium such as a memory card mounted on a removable drive. In this occasion, the function of copying a necessary file by one touch of a finger through the operation of a button provided in a screen of the programmable display device instead of operating a copy target file from a list is necessary from the viewpoint of a reduction in a work time of the operator in the site and prevention of wrong operation.

In this case, a copy source log file and a copy destination drive number need to be specified for the function of performing file copy operation by a drawing software. Therefore, inability to fix a drive number for a removable drive is a significant problem in system design. That is, to solve the problems of the cases explained above, it becomes important how a drive number of a removable drive or a removable device should be fixed.

In the apparatus including the configuration described in Patent Literature 1 proposed to solve the problem, a mechanism for retaining allocation information of a drive number for a removable device to allocate a fixed drive number to the same removable device is proposed. However, when mounting of a removable drive device not including a rewritable storage area in itself such as a memory card drive on which a memory card, which is a kind of the removable device, is mounted is considered, there is a problem in that the drive number of the removable drive device cannot be fixed.

This is a method of fixing a drive number for each of removable devices. Therefore, when a use is fixed to, for example, a removable device for backup of the log data collected by the programmable display device, the above problem may be unlikely to occur. However, in an actual use, in general, a plurality of arbitrary removable devices are used as such a removable device for backup, and it is assumed that no drive number is fixed for the removable drive in advance. Therefore, it is considered desirable to fix a drive number of a removable drive device rather than a drive number of each removable device.

On the other hand, in the apparatus including the configuration described in Patent Literature 2, by allocating a corresponding drive number to each of connection ports (interfaces), it is possible to fix drive numbers of a removable drive device connected to the connection port. However, when a removable drive device by the USB is assumed, it is necessary to take into account that the removable drive device is connected through a USB hub for multiplexing connection ports of the USB. In general, it is difficult to specify connection ports added by the USB hub. Therefore, in the method proposed in Patent Literature 2, there is a problem in that connection ports cannot be specified and, as a result, fixed allocation of drive numbers cannot be performed.

The present invention has been devised in view of the above and it is an object of the present invention to obtain an electronic apparatus capable of fixedly allocating drive numbers of a USB removable drive device connected to a USB hub, physical connection ports of which cannot be fixedly specified, even when the USB removable drive device is connected through the USB hub.

Solution to Problem

In order to solve the aforementioned problems, an electronic apparatus to which a plurality of USB removable drive devices for reading and writing an external storage medium are connectable and which allocates a drive number to the USB removable drive device connected thereto and managing the USB removable drive device according to one aspect of the present invention is configured to include: a USB interface to which the USB removable drive device is connected; a nonvolatile memory configured to store USB removable drive device peculiar information peculiar to the USB removable drive device and drive allocation information indicating correspondence between the USB removable drive device and the drive number and incorporated in the electronic apparatus; and a control unit configured to allocate, when information coinciding with the USB removable drive device peculiar information acquired from the USB removable drive device connected to the USB interface is included in the drive allocation information stored in the nonvolatile memory, the drive number associated according to the drive allocation information with the USB removable drive device connected to the USB interface.

Advantageous Effects of Invention

The electronic apparatus according to the present invention has an effect that it is possible to fixedly allocate a drive number of a USB removable drive device connected to a USB hub, physical connection ports of which cannot be fixedly specified, even when the USB removable drive device is connected through the USB hub and it is possible to perform system design with a drive number fixed in advance.

DESCRIPTION OF EMBODIMENTS

Embodiments of an electronic apparatus according to the present invention are explained in detail below based on the drawings. The invention is not limited by the embodiments.

First Embodiment

Figure 1:
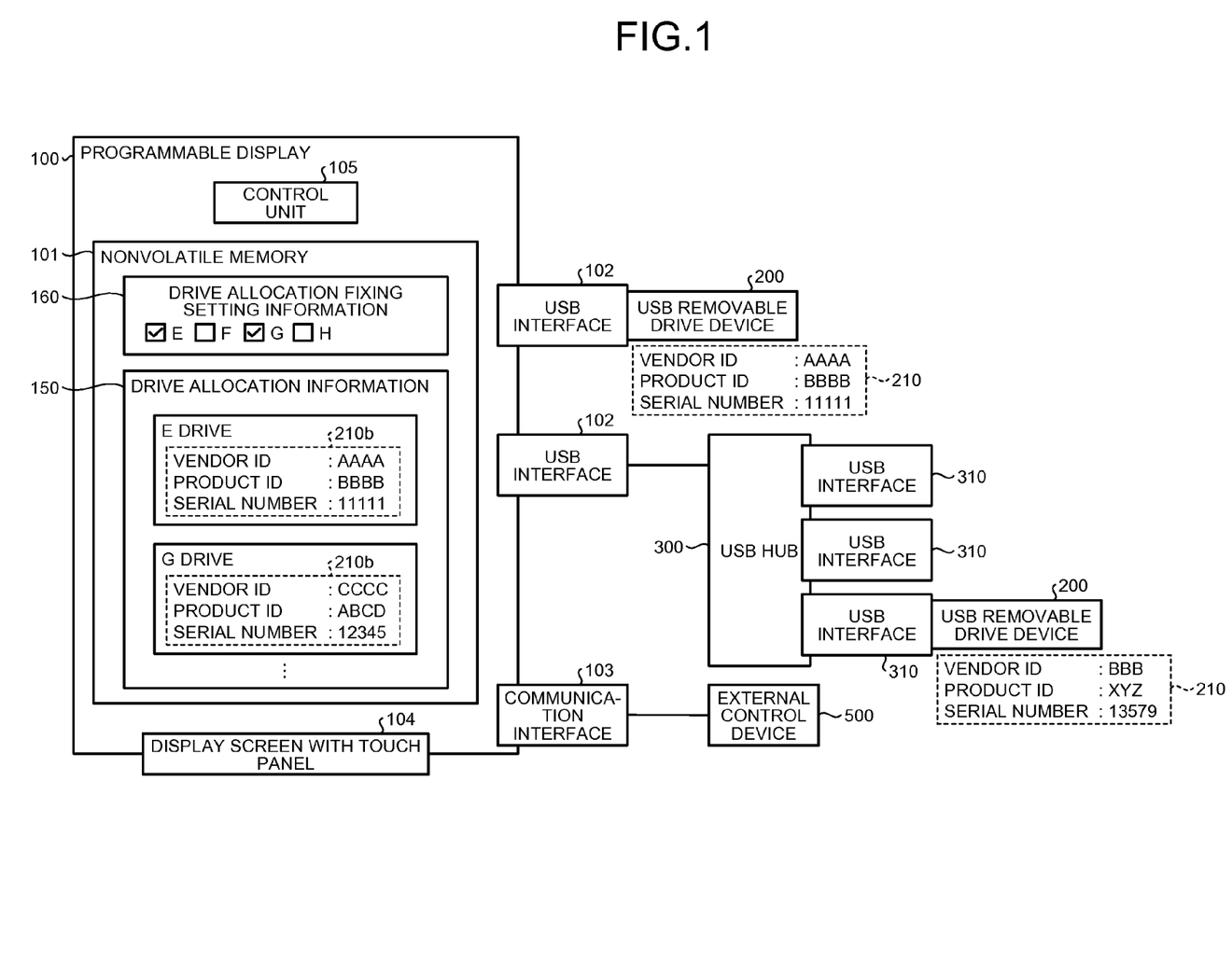
FIG. 1 is a block diagram of a configuration example of a programmable display device functioning as a first embodiment of an electronic apparatus according to the present invention.

FIG. 1 is a block diagram of a configuration example of a programmable display device functioning as a first embodiment of the electronic apparatus according to the present invention. A programmable display device 100 includes a nonvolatile memory 101, USB interfaces 102, a communication interface 103, a display screen with touch panel 104, and a control unit 105.

A USB removable drive device 200 and a USB hub 300 can be mounted on the USB interface 102. The USB removable drive device 200 mounted on a USB interface 310 included in the USB hub 300 can also be accessible from the programmable display device 100. The communication interface 103 is an interface for performing communication with an external control device 500 such as a programmable logic controller. The programmable display device 100 includes the display screen with touch panel 104 and enables display of information and an operation input by a touch on a screen.

The nonvolatile memory 101 has drive allocation information 150 for associating USB removable drive device peculiar information 210, which is information peculiar to the USB removable drive device 200, and a drive number allocated to the USB removable drive device peculiar information 210. For convenience, a sign 210b is given to USB removable device peculiar information recorded in the drive allocation information 150. However, it is assumed that the information is equivalent to the same information (the USB removable drive device peculiar information 210) stored in the USB removable drive device 200. The USB removable drive device peculiar information 210 has a vender ID for specifying the manufacturer of the device, a product ID for specifying the product format of the device, and a serial number for specifying the individual of the device. Some USB removable drive device does not have any serial number.

Further, the nonvolatile memory 101 stores drive allocation fixing setting information 160 for managing whether the USB removable drive device 200 is fixedly allocated to respective drive numbers or an arbitrary USB removable drive device 200 can be allocated to the respective drive numbers. The nonvolatile memory 101 is a storage device fixedly mounted on the programmable display device 100 and incorporated in the programmable display device 100.

The control unit 105 includes a central processing unit (CPU) configured to interpret a program for performing control of the programmable display device 100 and perform processing of data, a response to operation, and control of image display, and a nonvolatile memory (RAM) used as a work area during execution of the program.

As the configuration of the programmable display device 100, a general display of a touch panel type is shown. However, an operation input method is not limited to a touch panel. The programmable display device 100 can include an input device such as a keyboard or a mouse. The programmable display device 100 is configured to communicate with the external control device 500 via the communication interface 103. However, the programmable display device 100 does not always need to communicate with the external control device 500.

The programmable display device is explained as an example of the electronic apparatus of the present invention. However, the electronic apparatus can be an apparatus having any configuration as long as the apparatus includes a USB interface and a nonvolatile memory.

Figure 2:
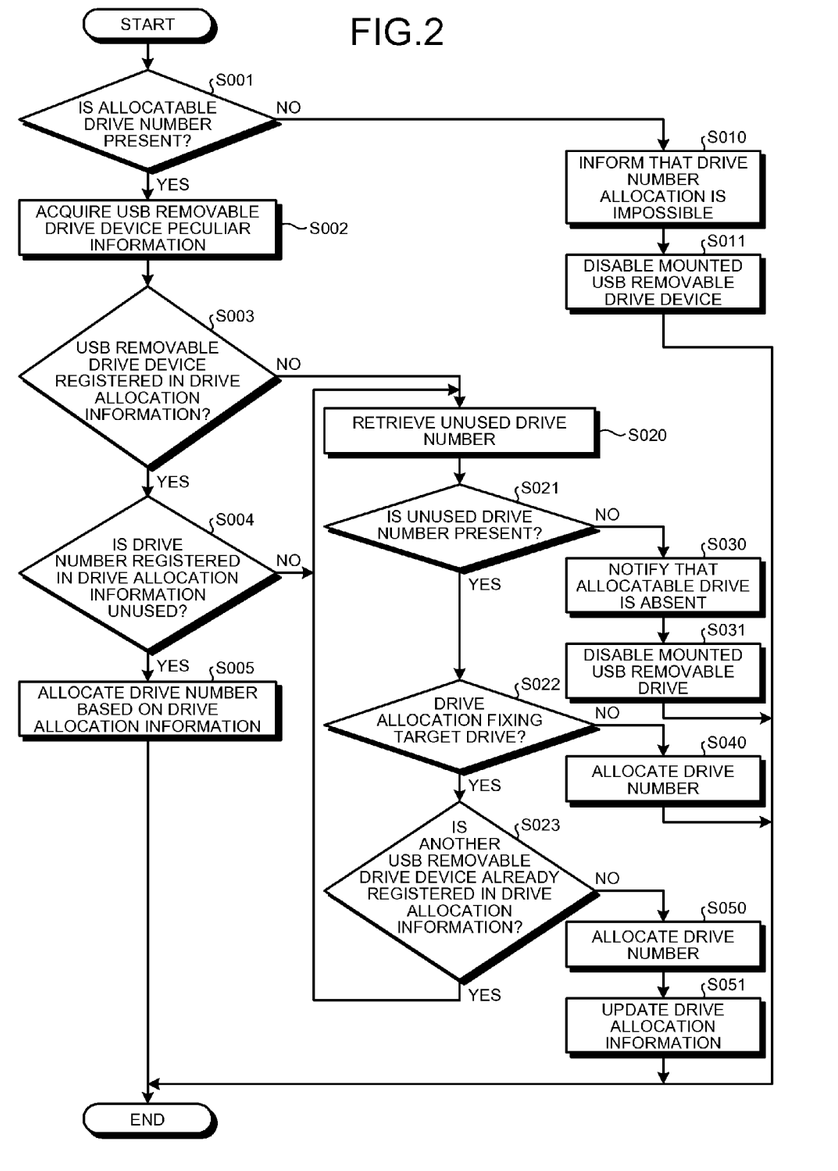
FIG. 2 is a diagram of a processing procedure performed when a USB removable drive device is mounted on a USB interface of the programmable display device.

FIG. 2 is a diagram of a processing procedure performed when the USB removable drive device 200 is mounted on the USB interface 102 of the programmable display device 100. First, the control unit 105 checks presence or absence of an allocatable drive number (step S001). When an allocatable drive number is absent (No at step S001), the control unit 105 displays, on the display screen with touch panel 104, to the effect that allocation of a drive number is impossible and notifies an operator to that effect (step S010). The control unit 105 disables the mounted USB removable drive device 200 (step S011).

When an allocatable drive number is present (Yes at step S001), the control unit 105 reads out the USB removable drive device peculiar information 210 stored in the USB removable drive device 200 (step S002). The control unit 105 compares the USB removable drive device peculiar information 210 read out from the USB removable drive device 200 and the USB removable drive device peculiar information 210b recorded in the drive allocation information 150 (step S003). When content coinciding with the content of the USB removable drive device peculiar information 210 read out from the USB removable drive device 200 is present in the USB removable drive device peculiar information 210b recorded in the drive allocation information 150 (Yes at step S003), the control unit 105 checks whether a drive number allocated to the USB removable drive device 200 is unused (step S004). When the drive number is allocatable (in other words, the drive number allocated to the USB removable drive device mounted on the USB interface 102 is unused) (Yes at step S004), the control unit 105 allocates the drive number corresponding to the USB removable drive device 200 mounted on the USB interface 102 to the USB removable drive device 200 (step S005). Thereafter, the control unit 105 ends the processing.

When the USB removable drive device peculiar information 210 read out from the USB removable drive device 200 is unregistered in the drive allocation information 150 (No at step S003) or when the drive number corresponding to the USB removable drive device peculiar information 210b of the USB removable drive device 200 mounted on the USB interface 102 drawn from the drive allocation information 150 is already used (No at step S004), the control unit 105 retrieves an unused drive number (step S020). When there are a plurality of unused drive numbers, the control unit 105 selects the lowest drive number among the allocatable drive numbers.

When an unused drive is detected (Yes at step S021), the control unit 105 refers to the drive allocation fixing setting information 160 and checks whether the detected drive number is a drive number of a drive on which an arbitrary USB removable drive device 200 can be mounted, i.e., whether a specific USB removable drive device 200 is set to be not fixedly allocated to the drive number (step S022). When an arbitrary USB removable drive device 200 can be allocated to the drive number (No at step S022), the control unit 105 allocates the retrieved usable drive number to the USB removable drive device 200 mounted on the USB interface 102 and ends the processing (S040).

When the retrieved drive number is a drive number to which a specific USB removable drive device 200 is set to be fixedly allocated (Yes at step S022), the control unit 105 refers to the drive allocation information 150 and checks whether another USB removable drive device 200 is already allocated to the drive number (step S023). When the USB removable drive device 200 is unregistered in the retrieved drive number (No at step S023), the control unit 105 allocates the retrieved drive number to the USB removable drive device 200 mounted on the USB interface 102 (step S050). Further, the control unit 105 associates the USB removable drive device peculiar information 210 of the USB removable drive device 200 mounted on the USB interface 102 this time with the drive number allocated in the present processing and updates the drive allocation information 150 (step S051).

When another USB removable drive device peculiar information 210 has already been allocated to the retrieved drive number (Yes at step S023), the control unit 105 regards the drive number as being in use and returns to the processing for retrieving another unused drive number (step S020). When an unused drive number is not found (No at step S021), the control unit 105 displays on the display screen with touch panel 104 to the effect that an allocatable drive number is absent and notifies the operator to that effect (step S030). The control unit 105 regards the USB removable drive device 200 mounted on the USB interface 102 as being disabled and ends the processing (step S031).

As a notification method for the drive number allocation impossibility notification (step S010) and the allocatable drive number absence notification (step S030), in general, in a programmable display device, a method of displaying a message on a dialog screen displayed to be superimposed on the display screen with touch panel 104 is conceivable. Besides, a method of writing a specific value in a device memory (a storage area for storing information) or the like included in the external control device 500 to perform the notification can also be adopted.

Usable drive numbers are E, F, G, and H, and among those drive numbers E, F, G, and H, the drive numbers to which the USB removable drive device 200 is fixedly allocated in the drive allocation fixing setting information 160 are E and G, and an arbitrary USB removable drive device 200 is set to be allocatable to the drive numbers F and H. Behavior in this case is explained as an example.

First, it is assumed that the USB removable drive device peculiar information 210b is unregistered in the drive allocation information 150. In this state, the USB removable drive device 200 is mounted on the USB interface 102. The drive having the lowest number among the drive numbers allocatable at this point is the E drive. According to the drive allocation fixing setting information 160, the E drive is set as a drive to which the USB removable drive device 200 is fixedly allocated. The USB removable drive device peculiar information 210b of the USB removable drive device 200 is unregistered. Therefore, the control unit 105 records, in the drive allocation information 150, the USB removable drive device peculiar information 210 of the USB removable drive device 200 mounted on the USB interface 102 anew. Consequently, the USB removable drive device 200 to which the E drive is allocated is specified.

Let us assume that, in a state in which the USB removable drive device 200 allocated with the E drive is mounted on the USB interface 102, another USB removable drive device 200 is mounted on another USB interface 102. The drive having the lowest number among drive numbers allocatable at this point is the F drive. According to the drive allocation fixing setting information 160, the F drive is set as a drive to which an arbitrary USB removable drive device 200 is allocated. Therefore, the control unit 105 allocates the F drive to the USB removable drive device 200 amounted on the USB interface 102 anew. At this point, the control unit 105 does not change the drive allocation information 150.

Let us assume that, in a state in which the USB removable drive device 200 allocated with the E drive and the F drive according to the procedure explained above is mounted, another new USB removable drive device 200 is further mounted on the USB interface 102. In this case, the drive having the lowest number among allocatable drive numbers is the G drive. According to the drive allocation fixing setting information 160, the G drive is set as a drive to which the USB removable drive device 200 is fixedly allocated. However, since the USB removable drive device peculiar information 210b of the USB removable drive device 200 mounted on the USB interface 102 anew is unregistered, the control unit 105 registers, in the drive allocation information 150, the USB removable drive device peculiar information 210 of the USB removable drive device 200 mounted on the USB interface 102 anew. Consequently, the USB removable drive device 200 to which the G drive is to be allocated is specified.

At this stage, the USB removable drive devices 200 are dismounted from the USB interface 102 once. Consequently, the E drive, the F drive, and the G drive are made reusable. Thereafter, let us assume that the USB removable drive device 200 different from the USB removable drive device 200 mounted most recently is mounted on the USB interface 102. In this case, the drive having the lowest number among usable drive number is the E drive. However, in the drive allocation information 150, the USB removable drive device peculiar information 210b of the other USB removable drive device 200 is already registered in the E drive. Therefore, the USB removable drive device 200 mounted on the USB interface 102 anew cannot be allocated to the E drive. Therefore, the control unit 105 retrieves another allocatable drive number. The drive number retrieved next is the F drive. An arbitrary USB removable drive device 200 is allocatable to the F drive. Therefore, the control unit 105 allocates the F drive to the USB removable drive device 200 mounted on the USB interface 102 anew.

Further, the USB removable drive device 200 allocated as the G drive before is mounted on the USB interface 102. At this point, the control unit 105 collates the USB removable drive device peculiar information 210 stored in the USB removable drive device 200 mounted on the USB interface 102 and the USB removable drive device peculiar information 210b recorded in the drive allocation information 150. As a result of the collation, the control unit 105 recognizes that the USB removable drive device peculiar information 210 matches the USB removable drive device peculiar information 210b corresponding to the G drive in the drive allocation information 150. In response to this result, the control unit 105 allocates the USB removable drive device 200 mounted on the USB interface 102 to the G drive.

In this way, concerning the drive number to which the USB removable drive device 200 is set to be fixedly allocated according to the drive allocation fixing setting information 160, the control unit 105 allocates the drive number of the drive on which the USB removable drive device 200 previously registered in the drive allocation information 150 is mounted before to the USB removable drive device 200 irrespective of the order of the mounting. On the other hand, the control unit 105 allocates the drive number to which an arbitrary USB removable drive device 200 is set to be allocatable in the drive allocation fixing setting information 160 is allocated to the USB removable drive device 200 unregistered in the drive allocation information 150.

In the procedure shown in FIG. 2, when the USB removable drive device 200 allocated to the drive allocation information 150 is absent (No at step S003), a method in which the control unit 105 retrieves the drive numbers in order from the lowest number irrespective of the setting content of the drive allocation fixing setting information 160 is explained. Therefore, in an initial state of the programmable display device 100, with respect to the drive number to which the USB removable drive device 200 is fixedly allocated in the drive allocation fixing setting information 160, the control unit 105 needs to mount the USB removable drive devices 200 in order until the USB removable drive device 200 can be specified. This could be considered undesirable. In such a case, for example, during the retrieval of an allocatable drive number (during the execution of step S020), first, the control unit 105 can retrieve a drive number in which the USB removable drive device 200 is unregistered in the drive allocation information 150 among the drive numbers to which the USB removable drive device 200 is fixedly allocated in the drive allocation fixing setting information 160.

It is also possible to allocate a peculiar USB removable drive device 200 to all the allocatable drive numbers without providing the drive allocation fixing setting information 160.

As explained above, the programmable display device according to the this embodiment has drive allocation information for managing association between the USB removable drive device peculiar information, which is information peculiar to an individual of a USB removal drive device, and a drive number corresponding to the USB removable drive device. The control unit manages, based on these kinds of information, allocation of a drive number for the USB removable drive device mounted in the past. That is, the control unit compares, through collation, the USB removable device peculiar information of the USB removable drive device mounted on the programmable display device and the USB removable drive device peculiar information included in the drive allocation information. When the both kinds of USB removable drive device peculiar information match with each other, the control unit regards the USB removable drive device as being a known USB removable drive device and allocates the drive number recorded in the drive allocation information to the USB removable drive device. Consequently, it is possible to fixedly allocate a drive number irrespective of the mounting order of each USB removable drive device. Therefore, in an apparatus in which it is necessary to specify a drive number used by a user in a system design stage, it is possible to perform system design with drive numbers fixed in advance.

The programmable display device according to this embodiment has, in the nonvolatile memory, drive allocation fixing information for managing whether removable drive devices allocated to respective drive numbers are fixed or an arbitrary USB removable drive device can be allocated to the respective drive numbers included in the nonvolatile memory. Therefore, it is possible to fixedly allocate a USB removable drive device to a specific drive number irrespective of the mounting order of the USB removable drive device and allocate an arbitrary USB removable drive device to another drive number. Consequently, it is possible to allocate a drive number peculiar to an individual of a USB removable drive device to a USB removable drive device built in the programmable display device and, on the other hand, allocate an arbitrary drive number to a USB removable drive device temporarily mounted for the purpose of, for example, extracting data.

Second Embodiment

Figure 3:
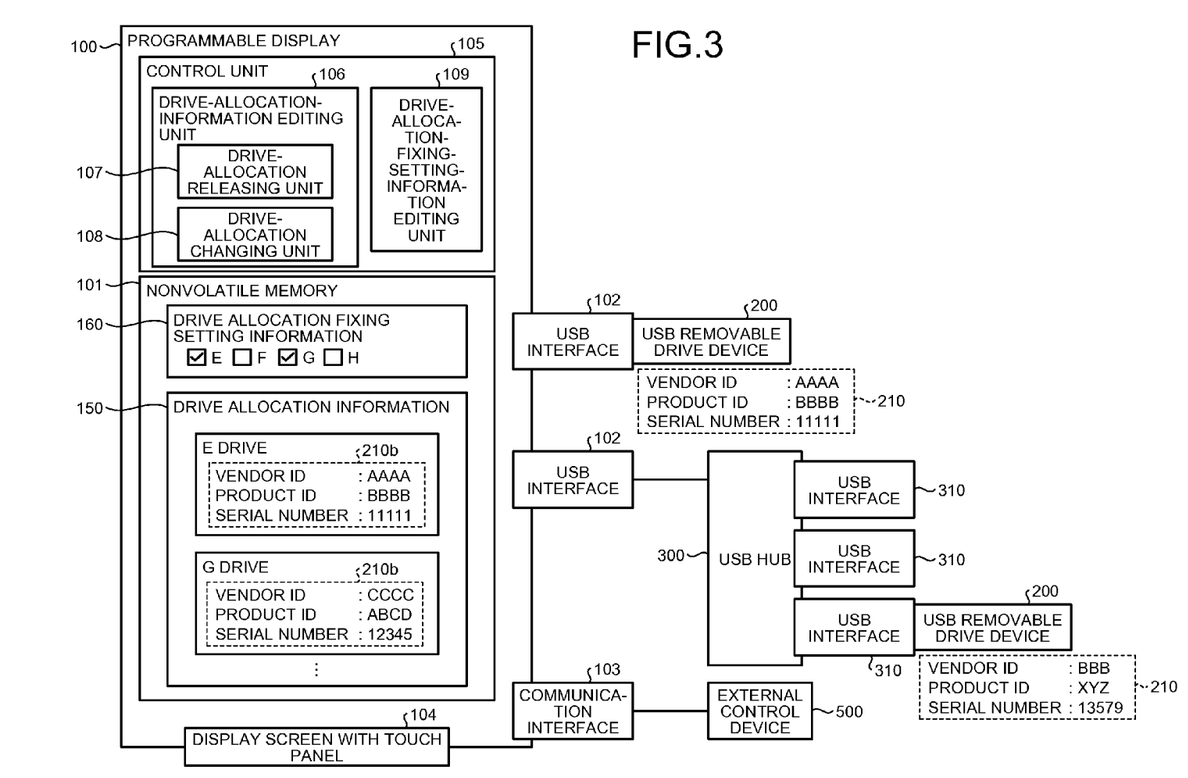
FIG. 3 is a block diagram of a configuration example of a programmable display device functioning as a second embodiment of the electronic apparatus according to the present invention.

FIG. 3 is a block diagram of a configuration example of a programmable display device functioning as a second embodiment of the electronic apparatus according to the present invention. The programmable display device is different from the first embodiment in that the control unit 105 includes a drive-allocation-information editing unit 106 and a drive-allocation-fixing-setting-information editing unit 109. The drive-allocation-information editing unit 106 includes a drive-allocation releasing unit 107 configured to release association between a specific USB removable drive device 200 and a drive number by the drive allocation information 150 and a drive-allocation changing unit 108 configured to change the drive number associated with the specific USB removable drive device 200 according to the drive allocation information 150 to another drive number. Otherwise, the programmable display device is the same as the first embodiment.

Figure 4:
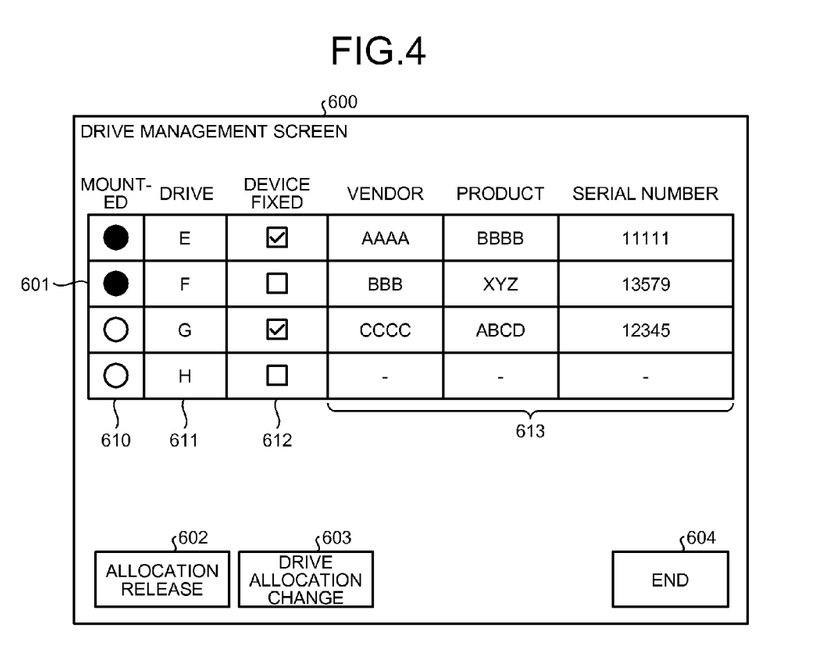
FIG. 4 is a diagram of the configuration of a drive management screen for editing drive allocation information and drive allocation fixing setting information in the programmable display device.

Operation and processing in editing the drive allocation information 150 and the drive allocation fixing setting information 160 on the programmable display device 100 according to the second embodiment are explained. FIG. 4 is a diagram of the configuration of a drive management screen 600 for editing the drive allocation information 150 and the drive allocation fixing setting information 160 in the programmable display device 100. The drive management screen 600 is a screen that the control unit 105 functioning as a GUI for editing the drive allocation information 150 and the drive allocation fixing setting information 160 causes the display screen with touch panel 104 to display. The drive management screen 600 is present as one of utility screens for managing setting of the programmable display device 100.

The drive management screen 600 includes a drive information list display area 601 for displaying a list of drive numbers usable in the programmable display device 100 and details of the drive numbers, an allocation release button 602 for releasing allocation of the USB removable drive device 200 allocated to a drive number, a drive allocation change button 603 for changing allocation of a drive number to the USB removable drive device 200, and an end button 604 for ending the operation of the drive management screen 600.

Information concerning usable drive numbers is displayed in rows of the drive information list display area 601. By touching a row, an operator can realize a selected state in which operation for a drive number indicated by the row can be performed.

The drive information list display area 601 includes a USB removable drive device mounting presence display area 610 indicating presence or absence of a mounted USB removable drive device 200 corresponding to the drive number, a drive number display area 611 for displaying a drive number, a drive allocation fixing setting state display area 612 for displaying a setting state of the drive allocation fixing setting information 160, and a USB removable drive device peculiar information display area 613 for displaying the USB removable drive device peculiar information 210.

Let us assume a state in which, in the drive allocation fixing setting information 160, it is possible to fixedly allocate the USB removable drive devices 200 to the E drive and the G drive and allocate arbitrary USB removable drive device 200 to the F drive and the H drive. In this case, it is assumed that the USB removable drive device peculiar information 210b has already been allocated to the E drive and the G drive. Further, it is assumed that the USB removable drive devices 200 are mounted on the E drive and the F drive and the USB removable drive devices 200 have not been mounted on the G drive and the H drive.

Operation for releasing, from this state, registration of the USB removable drive device peculiar information 210b allocated to the G drive and setting the USB removable drive device 200 mounted on the F drive as the USB removable drive device 200 fixedly allocated to the G drive anew is explained.

Figure 5:
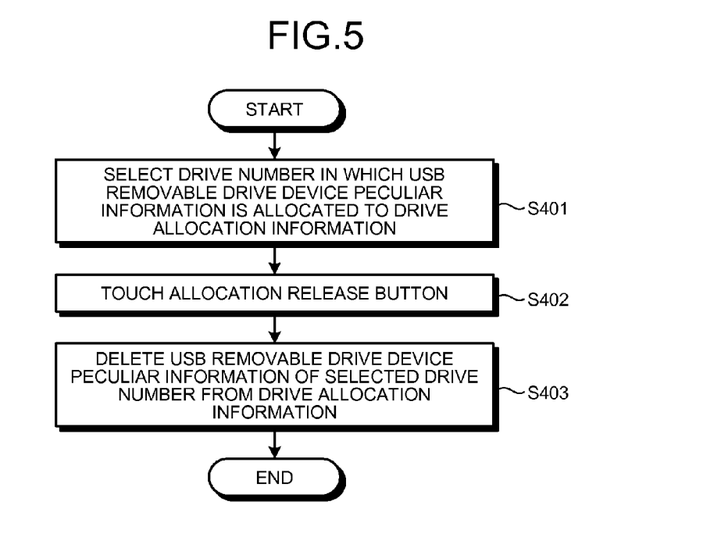
FIG. 5 is a diagram of a procedure for releasing USB removable drive device peculiar information allocated to drive allocation information.

FIG. 5 is a diagram of a procedure for releasing the USB removable drive device peculiar information 210b allocated to the drive allocation information 150. A procedure for releasing the USB removable drive device peculiar information 210b allocated to the G drive is explained based on FIG. 5. The operator touches the row of the G drive in the drive information list display area 601 of the drive management screen 600 to put the G drive in a selected state as an operation target (step S401). Subsequently, the operator touches the allocation release button 602 (step S402). As a result of this operation, the drive-allocation releasing unit 107 deletes the USB removable drive device peculiar information 210b associated with the selected drive number (the G drive) from the drive allocation information 150 (step S403).

Figure 6:
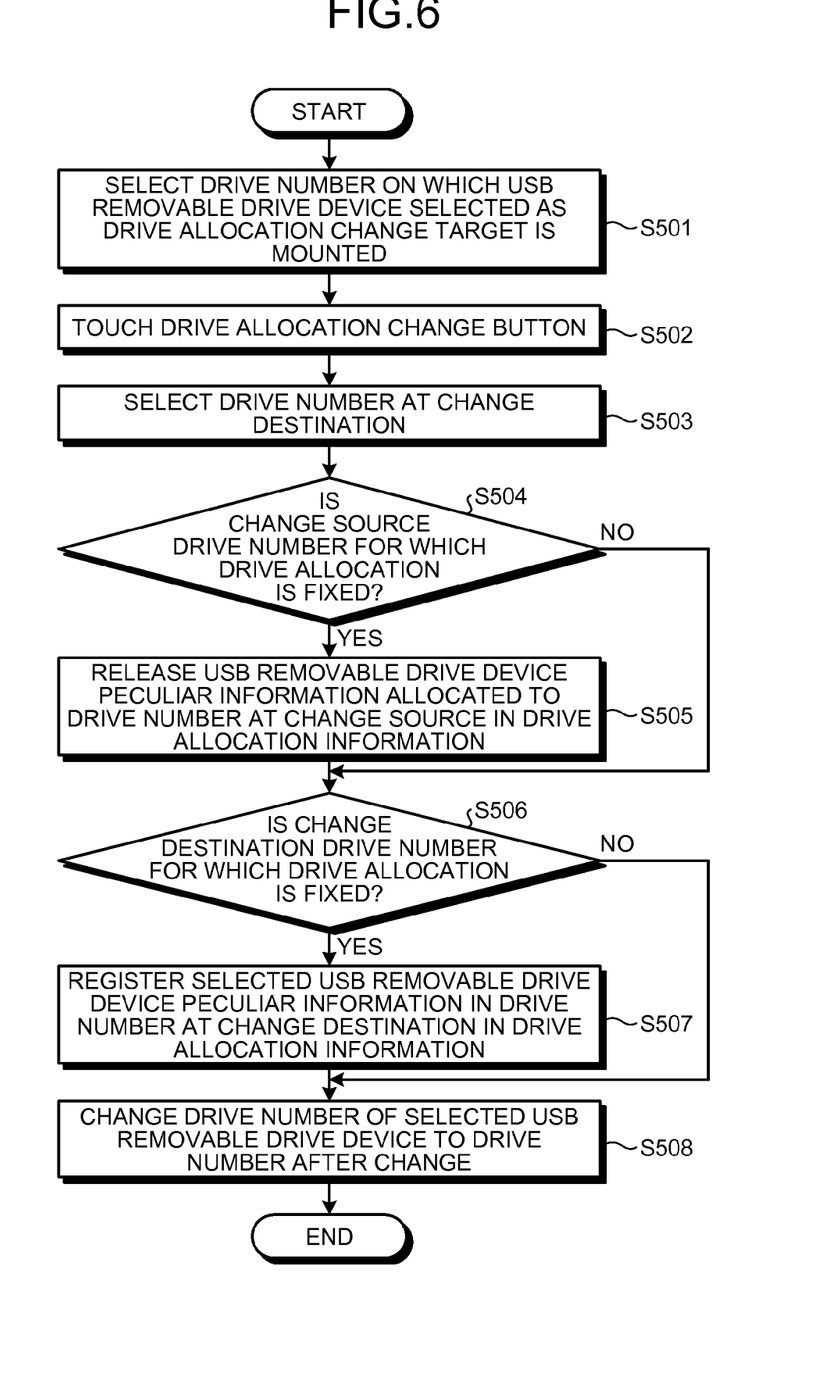
FIG. 6 is a diagram of a flow of processing in changing a drive number allocated to a USB removable drive device mounted on the programmable display device to another drive number.

FIG. 6 is a diagram of a flow of processing in changing a drive number allocated to the USB removable drive device 200 mounted on the programmable display device 100 to another drive number. A procedure for changing the USB removable drive device 200 allocated to the F drive to the G drive is explained based on FIG. 6. The operator touches the row of the F drive in the drive information list display area 601 of the drive management screen 600 to put the F drive in a selected state as an operation target (step S501). Subsequently, the operator touches the drive allocation change button 603 (step S502). Further, the operator selects the G drive as a drive number after change on a screen for selecting the drive number after change that the drive-allocation changing unit 108 causes the display screen with touch panel 104 to display (step S503). After this operation, the drive-allocation changing unit 108 checks whether a change source drive number is a drive number to which the USB removable drive device 200 is fixedly allocated in the drive allocation fixing setting information 160 (step S504).

In the present example, the F drive does not correspond to the drive number (No at step S504). Therefore, the drive-allocation changing unit 108 continues to check whether a change destination drive number is the drive number to which the USB removable drive device 200 is fixedly allocated (step S506). In the present example, the G drive is the drive to which the USB removable drive device 200 is fixedly allocated (Yes at step S506). Therefore, the drive-allocation changing unit 108 registers, in information concerning the G drive in the drive allocation information 150, the USB removable drive device peculiar information 210b of the USB removable drive device 200 originally allocated to the F drive (step S507). Further, the drive-allocation changing unit 108 changes the selected drive number of the USB removable drive device 200 from the F drive to the G drive (step S508).

When, at step S504, the selected change source drive number is a drive to which the USB removable drive device 200 is fixedly allocated (Yes at step S504), the drive-allocation changing unit 108 deletes the USB removable drive device peculiar information 210b registered in the relevant drive in the drive allocation information 150 (step S505).

When, at step S506, the selected change destination drive number is a drive number to which the USB removable drive device 200 is not fixedly allocated (No at step S506), the drive-allocation changing unit 108 does not carry out update of the drive allocation information 150 and carries out only the change of the drive number (step S508).

Although not shown in FIG. 6, in the process of the operation, for example, before carrying out the drive number allocation change, check operation can be inserted as appropriate.

Figure 7:
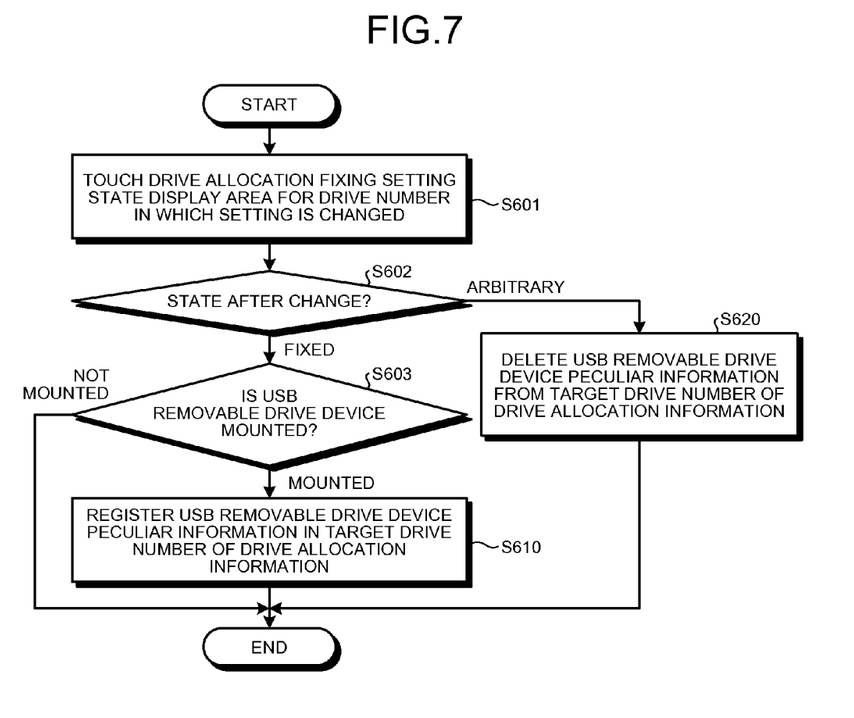
FIG. 7 is a diagram of a flow of processing during a change of drive allocation fixing setting information.

Further, operation for changing the drive allocation fixing setting information 160 in the programmable display device 100 is explained with reference to FIG. 7. FIG. 7 is a diagram of a flow of processing during a change of drive allocation fixing setting information.

The operator touches, in the drive allocation fixing setting state display area 612 of the drive information list display area 601 on the drive management screen, a row corresponding to a drive number in which the operator desires to change a state (step S601). Every time this touch operation is performed, the drive-allocation-fixing-setting-information editing unit 109 alternately switches two setting states, i.e., a state in which the USB removable drive device 200 is fixedly allocated and a state in which an arbitrary USB removable drive device 200 is made usable. When the setting is changed such that a drive to which the USB removable drive device 200 is fixedly allocated is made usable in an arbitrary USB removable drive device 200 (arbitrary at step S602), the drive-allocation releasing unit 107 deletes the USB removable drive device peculiar information 210b registered in the relevant drive number in the drive allocation information 150 (step S620). Thereafter, the drive-allocation releasing unit 107 ends the processing.

Conversely, when the setting is changed such that a drive number for which an arbitrary USB removable drive device 200 is made usable is fixedly allocated to the USB removable drive device 200 (fixed at step S602), if the USB removable drive device 200 has already been mounted on a drive of the drive number (mounted at step S603), the drive-allocation changing unit 108 registers the USB removable drive device peculiar information 210b of the USB removable drive device 200 in information of the relevant drive number of the drive allocation information 150 (step S610). When the operation is performed for a drive number of a drive on which the USB removable drive device 200 is not mounted (not mounted at step S603), the drive-allocation changing unit 108 does not change the drive allocation information 150. Thereafter, the drive-allocation changing unit 108 ends the processing.

According to this embodiment, USB removable drive devices allocated to respective drive numbers can be changed at any time. Therefore, for example, even when a USB removable drive device has to be changed because of a situation such as a failure of the USB removable drive device, it is possible to reallocate a drive number used in the past to a new USB removable drive device and use the new USB removable drive device.

When a change occurs in a system including a programmable display device and it is necessary to change the setting concerning whether allocation of a USB removable drive device to a drive number is fixed, it is possible to change drive allocation fixing setting information on the programmable display device at any time.

In the embodiments explained above the programmable display device is explained as an example of the electronic apparatus according to the present invention. However, the electronic apparatus according to the present invention has only to be an electronic device including a nonvolatile memory and a USB interface and is not limited to the programmable display device.

INDUSTRIAL APPLICABILITY

As explained above, the electronic apparatus according to the present invention is suitable for an industrial apparatus represented by a programmable display device in which a drive number for a USB removable drive device needs to be fixed at a point of functional design of the apparatus.

REFERENCE LIST

100 Programmable display device
101 Nonvolatile memory
102 USB interface
103 Communication interface
104 Display screen with touch panel
105 Control unit
106 Drive-allocation-information editing unit
107 Drive-allocation releasing unit
108 Drive-allocation changing unit
109 Drive-allocation-fixing-setting-information editing unit
150 Drive allocation information
160 Drive allocation fixing setting information
200 USB removable drive device 210, 210b USB removable drive device peculiar information
500 External control device
600 Drive management screen
601 Drive information list display area
602 Allocation release button
603 Drive allocation change button
604 End button
611 Drive number display area
612 Drive allocation fixing setting state display area
613 USB removable drive device peculiar information display area

The invention claimed is:

1. An electronic apparatus to which a plurality of USB removable drive devices for reading and writing an external storage medium are connectable, the electronic apparatus allocating a drive number to the USB removable drive device connected thereto and managing the USB removable drive device, the electronic apparatus comprising:
 a USB interface to which the USB removable drive device is connected;
 a nonvolatile memory configured to store USB removable drive device peculiar information peculiar to the USB removable drive device and drive allocation information indicating correspondence between the USB removable drive device and the drive number and incorporated in the electronic apparatus; and
 a control unit configured to allocate, when information coinciding with the USB removable drive device peculiar information acquired from the USB removable drive device connected to the USB interface is included in the drive allocation information stored in the nonvolatile memory, the drive number associated according to the drive allocation information with the USB removable drive device connected to the USB interface, wherein
 the nonvolatile memory further stores drive allocation fixing setting information indicating whether each of the drive numbers is fixedly allocated to a specific one of the USB removable drive devices, and
 the control unit allocates the drive numbers, for which setting for not allocating the drive number to the specific USB removable drive device is performed according to the drive allocation fixing setting information, to the USB removable drive devices other than the specific USB removable drive device in order of connection to the USB interface.

2. The electronic apparatus according to claim 1, wherein the control unit includes a drive-allocation-fixing-setting-information editing unit configured to change the drive allocation fixing setting information.

3. The electronic apparatus according to claim 1, wherein the control unit includes a drive-allocation-information editing unit including a drive-allocation changing unit configured to change the drive number associated with the specific USB removable drive device according to the drive allocation information to another drive number and a drive-allocation releasing unit configured to release the association of the specific USB removable drive device with the drive number by the drive allocation information.

4. The electronic apparatus according to claim 1, wherein the electronic apparatus is a programmable display device including:
 a communication interface for connection to an external control device; and
 a display screen with touch panel configured to display an operation state of the external control device connected via the communication interface and receive setting operation for the external control device.

* * * * *